Dec. 30, 1958  H. M. MUNCHERYAN  2,866,338
TEMPERATURE-INDICATING DEVICE AND CLOSURE CAP
Filed Aug. 31, 1953  3 Sheets-Sheet 1
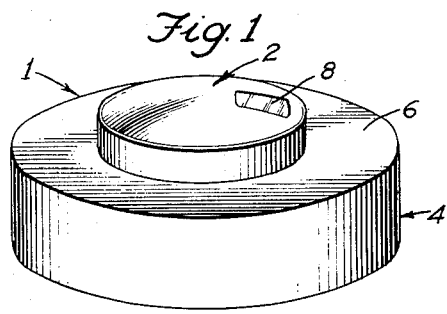
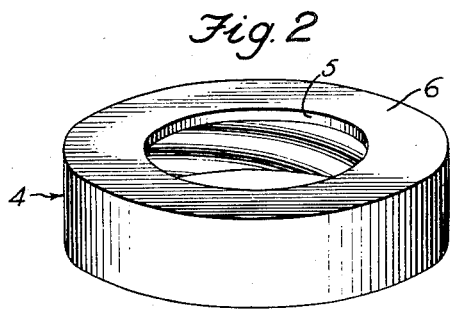
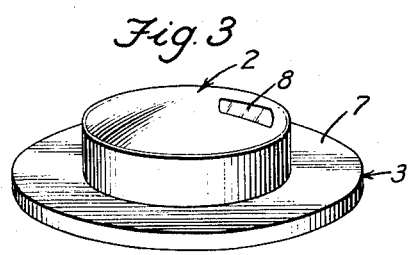
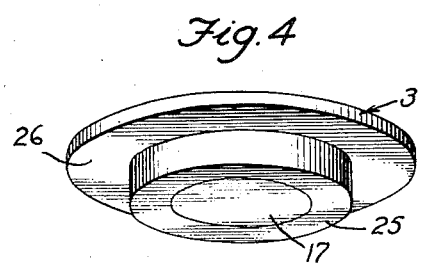
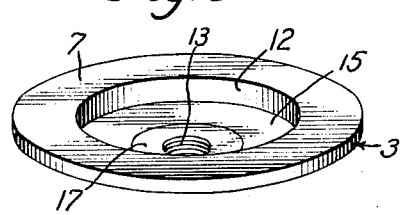
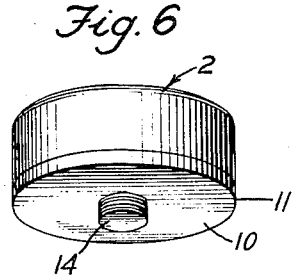
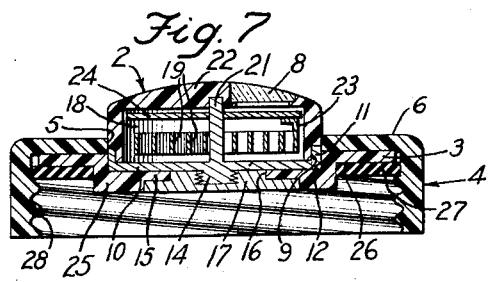
INVENTOR

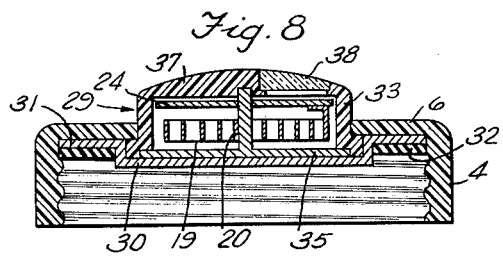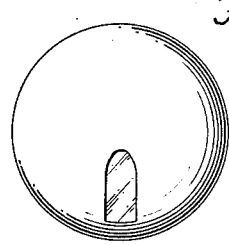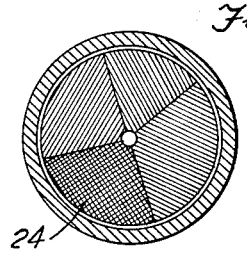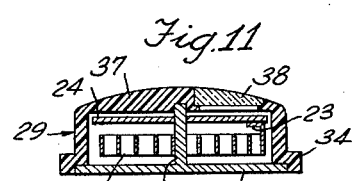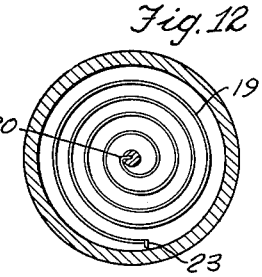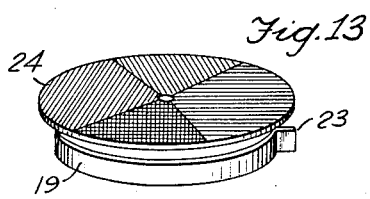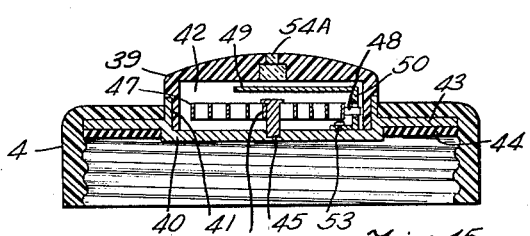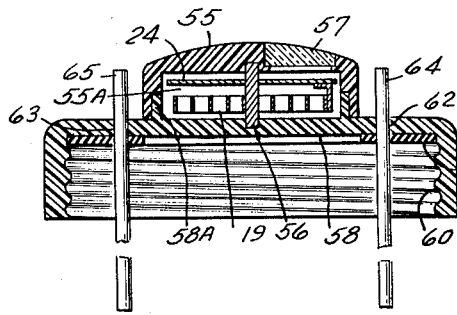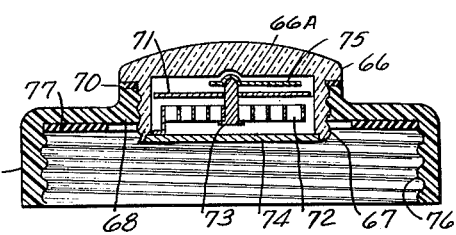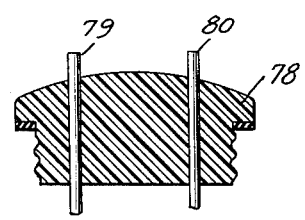

Dec. 30, 1958  H. M. MUNCHERYAN  2,866,338
TEMPERATURE-INDICATING DEVICE AND CLOSURE CAP
Filed Aug. 31, 1953  3 Sheets-Sheet 3
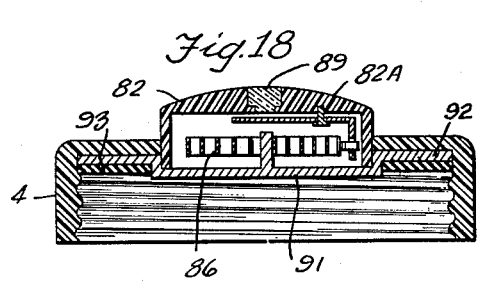
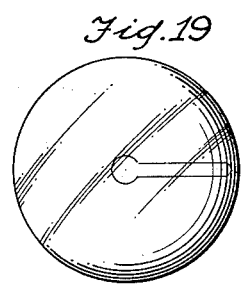
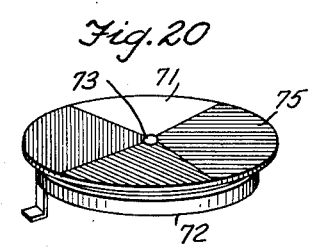
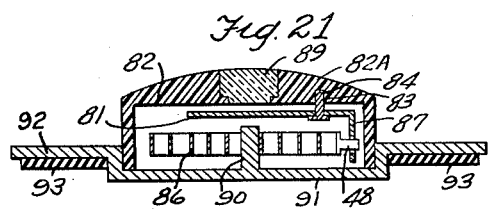
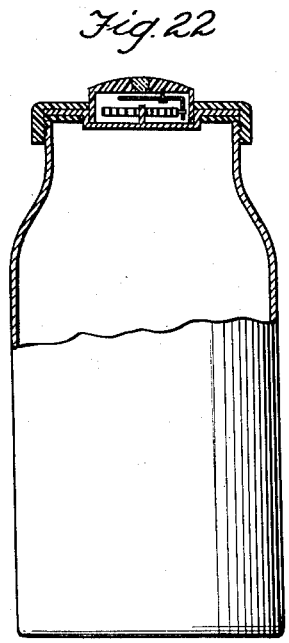
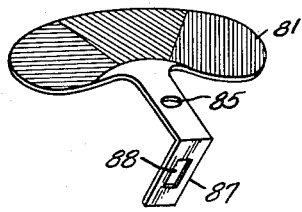
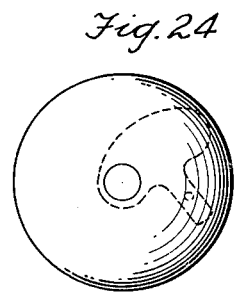
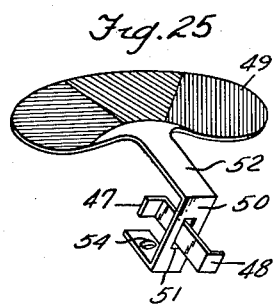

United States Patent Office 2,866,338
Patented Dec. 30, 1958

2,866,338

TEMPERATURE-INDICATING DEVICE AND CLOSURE CAP

Hrand M. Muncheryan, Duarte, Calif.

Application August 31, 1953, Serial No. 377,610

26 Claims. (Cl. 73—343)

The present invention relates to temperature-indicating devices, and more particularly to a thermostatically-controlled indicator which is integrated in a closure cap such as that used on infant-nursing bottles or the like.

This invention includes further modified embodiments of the temperature-indicating devices described and claimed in the applications filed by me in the United States Patent Office, under the Serial No. 345,346, and now Patent No. 2,755,665 issued on July 24, 1956, and Serial No. 350,626, and now Patent No. 2,755,666 issued on July 24, 1956. In the Patent No. 2,755,665, I have disclosed a temperature indicator which, in use, is mounted in the neck of a conventional-type infant-nursing bottle or blood-plasma container, with the temperature-indicating portion of the principal embodiment of the device projecting into the bottle. In the Patent No. 2,755,666, the temperature-indicating portion of the device is shown to be located outside of the bottle and projecting through an aperture in the center of the closure cap or internally flanged annuls and forming a part thereof.

The principal advantage of the present invention is the provision of a temperature-indicating device which forms, integrally or detachably, a part of the closure cap of a liquid-dispensing bottle, the temperature of whose contents can be readily determined by a glance at the cap.

Another object of the invention is to provide a temperature-indicating device which is particularly adapted to most of the conventional-type plasma-dispensing bottles or infant-nursing bottles, in which embodiment the temperature-indicating portion of the cap is readily replaceable by an infant-nursing nipple, a liquid-dispensing spout, or the like.

A further object of the invention is to provide in an easily noticeable part of the closure cap a window through which the temperature of the contents of the bottle can be readily determined by the color of a thermostatically-actuated disc or dial having a plurality of variously colored areas on its surface and disposed adjacent to said window, each of said colored areas designating a specific degree of temperature ranging from room temperature to the temperature of boiling water.

A still further object of the invention is to provide a temperature-indicating device which, when desired, can be removed from the closure cap without removing the cap and without breaking the seal of the bottle.

A still further advantage of the invention resides in the unique construction of one embodiment in which means are provided for filling or dispensing the contents of the bottle without removing the sealed closure cap or the integral temperature indicator thereof.

An additional object of the invention is to provide a temperature-indicating device which is rugged in construction and which can withstand, without damage, sudden shocks and the ranges of temperatures encountered in warming or sterilizing the contents of the container on which the device will be employed.

Other objects and advantages of this invention will be best understood from a consideration of the following specification taken in conjunction with the accompanying drawings forming a part thereof, and wherein like numerals designate coresponding parts throughout several views of the invention; it being understood that the invention is not confined to the disclosure but is susceptible to modifications without a departure from the spirit and scope of the invention as expressed in the appended claims.

In the drawings:

Figure 1 is a plan view of the temperature-indicating device and closure cap constructed in accordance with the principle of my invention.

Figure 2 is a plan view of the internally threaded and flanged annulus for accommodating the temperature-indicating device.

Figure 3 is a view in elevation of the temperature-indicating device fastened to a cap-sealing flanged receptacle.

Figure 4 is the bottom view in elevation of the flanged receptacle.

Figure 5 is the top view in elevation of the flanged receptacle, with the temperature-indicating device removed so as to show the construction of the recessed portion and the centrally located threaded socket in the base plate of the flanged receptacle.

Figure 6 is a slightly tilted view in elevation of the temperature-indicating device showing the threaded projection which engages in the threaded socket of the flanged receptacle.

Figure 7 is a detail sectional view of the temperature-indicating device and closure cap shown in Figures 1 through 6.

Figure 8 is a detail sectional view of a modified embodiment of the invention embodying another form of a removable temperature-indicating device.

Figure 9 is the top plan view of the temperature-indicating device generally applying to Figures 1, 7, 8, 11, and 16.

Figure 10 is a sectional view of the temperature-indicating device taken on lines 10'—10' of Figure 7, and applies to all embodiments shown in Figures 7, 8, 11, and 16.

Figure 11 is a sectional view of the temperature-indicating device embodied in the form shown in Figure 8.

Figure 12 is a sectional view of the temperature-indicating device taken on a plane parallel and below the lines 10'—10' of Figure 7, with the colored indicating discal dial removed so as to expose the thermostatic element embodied and shown in the sectional views of all the embodiments except that in Figure 17.

Figure 13 is the plan view of the indicating dial and the thermostatic element.

Figure 14 is the plan view of the window element embodied in the forms shown in Figures 1, 3, 6, 7, 8, 11, and 16.

Figure 15 is a sectional view of a modified embodiment of the temperature-indicating device.

Figure 16 is a sectional view of another modified embodiment of the temperature-indicating device and closure cap, showing the liquid inlet and outlet members.

Figure 17 is a sectional view of still another modified embodiment of the invention, showing a plug-type removable temperature-indicating device.

Figure 17A is the sectional view of a threaded plug with liquid inlet and outlet channels; this plug is interchangeable with the temperature-indicating plug unit shown in Figure 17.

Figure 18 is a sectional view of still another modified embodiment of the temperature indicator.

Figure 19 is the top plan view of the plug-type removable temperature indicator sectionally shown in Figure 17.

Figure 20 is a plan view of the temperature-indicating discal dial and the thermostatic element embodied in the modified form shown in Figure 17 (or 19).

Figure 21 is a sectional view of the temperature-indicating device isolated from the internally flanged annulus of the embodiment shown in Figure 18 and magnified in order to show detail construction of the unit.

Figure 22 is a typical conventional-type liquid-dispensing bottle, such as a baby-nursing milk bottle, showing in partially sectioned view the manner of accommodating the present invention on the container.

Figure 23 is a view in elevation of the semilunar temperature-indicating dial embodied in Figures 18 and 21.

Figure 24 is the top view of the temperature-indicating device generally representing the embodiments shown in Figures 15, 18, and 21.

Figure 25 is an isometric view of the semilunar temperature-indicating dial embodied in Figure 15, showing the general manner in which the terminal end of the thermostatic element is attached to this dial.

With reference to the drawings the numeral 1 illustrates the plan view of the temperature-indicating device and closure cap, made of a suitable material such as plastic, composition material, glass, rubber, or metal. The unit consists of three main parts: A plug or cap member 2, a flanged receptacle 3, to which the cap member 2 is detachably secured, and an internally flanged annulus 4, which is adapted to accommodate said indicating cap member 2 together with the flanged receptacle 3, forming an indicating closure cap. The annulus 4 is screw-threaded internally for securing the entire assembly on a container similarly screw-threaded, such as a conventional baby-nursing milk bottle. For attaching the device on the bottle, the cap member 2 may first be secured to the flanged receptacle 3 and then inserted from the lower open end of the annulus 4 into the aperture 5 located in the internal flange 6 integrally formed thereof, so that the cap member 2 protrudes through said aperture, as shown in Figure 1. In this manner, the upper surface 7 of the flange of receptacle 3 is in abutting relation to the undersurface of the internal flange 6 of the annulus 4. In an alternative manner, the flanged receptacle 13 may be disposed in the annulus, in abutment with the internal flange 6, and then cap member 2 may be inserted through the aperture 5 and secured to the receptacle 3 by screw movement.

A window 8 made of transparent plastic or glass and curved to serve as a magnifying lens is disposed in the dome of the cap member 2 and diametrically thereof, for viewing the temperature condition as indicated by the device. The end opposite the windowed dome of the cap 2 is peripherally reduced to form an annular recess 9, and a cover plate 10 of heat-conducting material with an upwardly projecting flange 11 is fitted over the recess 9 and permanently sealed thereon by means of a suitable binder, forming a chamber in said cap.

The flanged receptacle 3 contains in its central area a pan-shaped section 12, which is provided with an internally threaded socket 13 in its center. The threaded projection or pin 14 located on the undersurface of cover plate 10 is screwed snugly into this socket, so that the flanged section of receptacle 3 extends outwardly at right angles to the periphery of cap 2. The bottom of the pan-shaped section 12 of receptacle 3 is formed of an integral shoulder 15 with a centrally formed aperture 16 into which a base plate 17 of heat-conducting material is secured permanently by press-fitting or by means of a binder. The socket 13 is formed in the base plate 17. When the cap or plug 2 is tightly secured in the pan-shaped section 12, the base plate 17 makes a close thermal contact with the cover plate 10 so that the heat from the medium whose temperature is to be determined can be easily conducted to the interior of the plug 2. In this way, the flanged receptacle 3 can be made of a heat-insulating material, such as plastic, rubber, glass, nylon, or any other suitable composition material.

Numeral 18 designates the chamber in the temperature-indicating cap member 2. This chamber contains a thermostatic or bimetallic spiral element 19, the inner end 20 of which is secured to an axial pin 21 centrally located in the chamber 18. The projection 14 is a continuation of pin 21, both of which members are integral with the cover plate 10. The upper free end of pin 21 projects into a depression or cavity in the dome 22 of the cap member 2. The outer end 23 of the thermostatic spiral 19 is secured to the peripheral margin of a discal dial 24 transversely disposed in chamber 18 and between the window 8 and the spiral 19. The dial 24 contains a central aperture through which the axial pin 21 passes before it enters the dome 22. By this arrangement, when the thermostatic element 19 is actuated by change of temperature, it rotates the dial peripherally and around the axial pin 21. The dial 24 may be made of a thin sheet of plastic, paper, copper, aluminum, or the like, and has on its upper surface a plurality of consecutively-arranged distinct areas or sectors for designating different temperatures. The areas may be differentiated by different colors, and I prefer to use at least three areas colored blue, green, and red, or any other suitable temperature-identifying means. When using the three colors, the blue designates cold, the green warm or normal, and the red area designates hot with respect to human-body temperature.

The colored areas of the temperature-indicating dial are calibrated against a precision mercury thermometer so that the blue area will cover a range from 40° to 85° F., the green will cover a range from 85° to 110° F., and the red area will cover a range from 110° F. to the boiling point of water (212° F.). The dial rotates freely about the upper portion of pin 21. When the temperature is raised the thermostatic element 19 expands and coils on itself, so that its outer end 23 causes the dial 24 to rotate counterclockwise (see Figure 12), and when the temperature is lowered the element 19 contracts and unwinds itself, causing the dial 24 to rotate clockwise, in proportion to temperature change. Because of the curved character of the magnifying window 8 provided in the dome 22 of the cap member 2, the emergent ray of the image of the colored area appearing behind the window 8 becomes refracted toward the horizontal plane, so that the image of the colored area can be seen from angles other than the vertical plane.

The undersurface of flange 26 is provided with a gasket 27 made of a resilient material such as rubber. The gasket 27 is peripheral to the circular area 25 and is affixed to the flange 26 by means of a binder. In use, the entire assembly, shown in Figure 1 and sectionally illustrated in Figure 7, is secured on the mouth of a bottle or container by employing a screwing motion whereby the threads 28 engage the annulus 4 on the externally threaded rim of the bottle, the gasket 27 making a tight seal (Figure 22).

A modified embodiment of the invention is illustrated in Figure 8, in which the internally flanged annulus 4 accommodates a removable temperature-indicating plug 29. The plug 29 is disposed between the flanged receptacle 30 and the internal flange 6 of the annulus 4. The receptacle 30, together with its integral circular flange 31, is also removably accommodated in the annulus 4. An annular resilient gasket 32 is permanently secured with a suitable binder to the underside of flange 31. In assembly for use on a bottle, the plug 29 is placed in the pan-shaped cavity of the flanged receptacle 30, and the plug 29 together with receptacle 30 is inserted into the circular aperture 5 so that the flange 31 is in abutting relation to the undersurface of the internal flange 6 of the annulus 4. This arrangement forms a complete temperature-indicating closure cap unit, which is then screwed over the threaded neck portion of a conventional baby-nursing bottle.

The plug 29, which may be made of metal but is preferably made of a plastic or composition material, consists of a casing or cap member 33, somewhat similar to the cap 2 shown in Figure 6, with the exception that its open end is made larger in diameter to form an annular shoulder 34 on its external periphery, thus providing an internal recess to receive a heat-conductive circular cover plate 35; the cover plate 35 is hermetically sealed to shoulder 34 with a suitable binder. An axial pin 36 integral with the plate 35 extends centrally to the dome-like top portion 37 of cap member 33. Spirally disposed around said pin 36 is a thermostatic element 19 (the same bimetallic type of element used in the embodiment shown in Figure 7), the inner terminal 20 of which is permanently secured by welding or crimping to the pin 36. The outer terminal 23 is secured to the underside of a dial 24 in marginal relation thereto, so that as the thermostatic element 19 expands or contracts the dial 24 rotates accordingly and indicates the relative temperature through a magnifying window 38 disposed in the dome 37 of plug 29.

Since the top views of all the temperature-indicating plugs shown in Figures 1, 3, 6, 7, 8, 11, and 16 are identical, Figure 9 represents the general structure as seen from the top of all these plugs. Similarly, Figures 10 and 12 respectively disclose a representative temperature-indicating dial and a thermostatic element employed in the structures illustrated in Figures 1, 3, 6, 7, 8, 11, and 16; hence, the reference numerals 19, 20, 23, and 24 are conserved in the respective figures of the drawing.

Figure 15 represents a modified embodiment of the temperature-indicating device, in which the cap member 39 is integral with the circular flanged receptacle 40 by being sealed thereto at the joint 41, forming a cylindrical chamber 42 therein. The flanged receptacle 40 is made of a heat-conducting material, such as metal, and has on the underside of its annular flanged part 43 a gasket 44 made of a resilient material, such as rubber or composition material. The entire assembly is removably accommodated in the flanged annulus 4, which is adapted to be secured on a nursing bottle. Centrally located in the cylindrical chamber 42 is an axial pin 45 made of heat-conducting material. The lower end of said pin 45 is secured to the flanged receptacle 40 whereas its upper end is secured to the inner terminal 46 of the thermostatic coil element 47 spirally disposed around the pin 45. The outer end 48 of the element 47 engages with the temperature-indicating semilunar disc 49 at the bridge 50 by passing through the rectangular aperture 51 formed in bridge 50 and being bent around the bridge 50; this arrangement forms a U-shaped structure projecting from the semilunar disc 49, as illustrated in Figure 25. The disc 49 similarly has differently-colored areas on its surface, each color representing the corresponding temperature as in discal dial 24. A reduced rectangular portion 52 (Figure 25) extends from the base of the semilunar disc 49 and is integral with the bridge portion 50. A pin 53 is secured to flanged receptacle 40, on the radial aspect thereto, and its free end passes through an aperture 54 (Figure 25) contained in the lower leg of U-shaped extension of dial 49, so that the latter rotates around said pin 53 as a pivot.

A unique feature of the embodiment shown in Figure 16 is the integral construction of the cap 55 with the annulus 59 closed at one end by a circular plate 58. A chamber 55A is disposed in cap 55, with the circular plate 58 of the annulus 59 forming the base of the cap 55. Centrally positioned on the circular plate 58 of the annulus 59 is a pin 56 which extends axially to the dome of cap 55. A thermostatic spiral 19 is disposed around the pin 56 and having one end secured to pin 56 and the other end to the periphery of the indicator dial 24 positioned between the spiral 19 and the dome of the cap 55. The dial 24 has a centrally-located aperture with said axial pin 56 passing therethrough, and a plurality of colored areas are arranged on its surface to represent temperature conditions. A magnifying window 57 is disposed in the dome of cap 55, and said dial 24 rotates relative to said window by means of said spiral 19 upon change of temperature thereof. The circular plate 58 of annulus 59 is provided with a pan-shaped section formed by the upwardly projecting annular flange 58A centrally positioned thereon; the end opposite to the dome of cap 55 is internally recessed to receive the annular flange 58A and is secured thereon by a suitable binder. The section designated by numeral 58 constitutes the bottom plate of the temperature indicator and the top wall of the annulus 59. The annulus 59 is provided with an internally threaded portion 60 for securing the device on a bottle, with the annular gasket 61 serving to make a tight seal. Apertures 62 and 63 are disposed in the circular plate 58 peripherally to cap 55. The tubular members 64 and 65 are respectively secured in apertures 62 and 63, and are used for filling or dispensing fluid from a container equipped with this indicator cap. This cap is particularly useful for administering whole blood, plasma, or any other sterile liquid to a patient, since the tubes 64 and 65, together with the entire indicator-cap assembly, can be sealed hermetically and sterilized before storage or shipment.

A still further modified form of the device is shown in Figure 17, in which the plug member 66 contains the temperature indicator and is provided with a transparent dome 66A and an externally threaded portion 67 which screws on the similarly threaded apertured portion 68 of the closure member 69, which in general is similar to annulus 4 except that the apertured portion 68 is thickened to permit screw threads to be formed thereon. The plug body 66 is securely fastened on portion 68 by means of the resilient gasket 70. The temperature-indicating mechanism of this device consists of a transversely positioned stationary dial 71 having consecutively colored areas thereon, and a thermostatic spiral 72 with its inner end secured permanently to a centrally located pin 73 and its outer end to the cover plate 74; an indicating pointer 75 is secured to the end of pin 73 and rotates by means of spiral 72 over the colored areas of dial 71 to indicate the relative temperature, as the spiral 72 rotates by expansion and contraction in accordance with temperature change. The entire unit attaches to the neck of a bottle or container and screws thereon by means of the threaded portion 76, with the annular gasket 77 making a tight seal. If desired, the indicator plug 66 may be replaced by a plug 78, shown in Figure 17A, for filling or dispensing fluids respectively in or out of a bottle by means of the inlet and outlet tubes 79 and 80 disposed in said plug. Figure 19 shows the top view of the temperature indicator and Figure 20 illustrates the details of the temperature-indicating mechanism.

Figures 18 and 21 present an embodiment generally similar to that shown in Figure 15, with the exception that the indicating semilunar dial 81 is rotatably mounted on the dome 82A of cap member 82 at point 83 by means of the pin 84, which passes through the round aperture 85 located near the base of the semilunar dial 81 and secures to dome 82A; thus, this pin serves as an axis for rotation of the dial 81. The dial 81 contains, similarly to dial 24, a plurality of colored areas thereon to represent temperature conditions and is actuated by means of the thermostatic spiral 86 having one end secured to dial 81 at the L-shaped section or lip 87 by said end passing through the rectangular aperture 88 formed in said lip 87 and being crimped thereon. The other end of spiral 86 is secured to a pin 90 centrally formed on a flanged cover plate or receptacle 91 hermetically sealed on cap 82 by means of a suitable binder. The flanged receptacle 91 is made of metal, such as aluminum, stainless steel, or the like. A magnifying window 89 is disposed on the diametric aspect of said dome 82A for viewing the temperature condition indicated by said dial 81 adjacent thereto. The flanged section 92 of receptacle 91 extends substantially at right angles to the periphery of cap 82. A resilient gasket 93 is affixed under the flanged section 92. For mounting the indicating device on a conventional baby-nursing milk bottle, the cap 82 is accommodated in the annulus 4, as shown in Figure 18, by inserting the cap portion 82 into the aperture of flange 6 of the annulus 4, and then screwing the assembly on the mouth of the bottle, with the gasket 93 making a tight seal therebetween. Figure 24 shows the top view of the temperature indicator units sectionally shown in Figures 15, 18, and 21.

Figure 22 presents the manner in which the temperature-indicating device and closure cap is mounted on a representative bottle. All of the embodiments illustrated in the drawings can be used interchangeably on this container in the manner shown.

I claim:

1. A temperature-indicating device and closure cap, comprising an annulus adapted to be secured on a nursing milk bottle and having an internal flange providing a centrally located aperture, a cap member having a dome with a magnifying window therein, the end opposite said dome being closed by a cover plate hermetically sealed thereon, forming a chamber therein, a pin axially extending between said cover plate and said dome, a thermostatic element spirally disposed around said pin and having one end secured to said pin and its other end to an indicating dial transversely disposed in said chamber between said window and said thermostatic element, said indicating dial having a plurality of colored areas consecutively arranged thereon and being rotative, by means of said thermostatic element, around said pin and relative to said window, and a circular flanged receptacle detachably secured to said cap at said cover plate; said cap member with said flanged receptacle being accommodated in said annulus and protruding through said aperture.

2. A temperature-indicating device and closure cap, comprising a cap member having a dome with a magnifying window diametrically disposed therein, the end opposite to said dome being closed by a cover plate forming a chamber in said cap, pins centrally formed on opposite sides of said cover plate and integrally thereof, one of said pins being in said chamber and extending to said dome and the other to the exterior of said cover plate and adapted to be engaged with a circular flanged receptacle disposed in abutting relation to said cover plate, the flange section of said receptacle projecting peripherally at right angles to said cap member, a circular disc with temperature-indicating colored areas thereon being transversely positioned in said chamber and having in its center an aperture with said axial pin passing therethrough, a thermostatic spiral coiled around said axial pin and having one end secured to said pin and the other end to the periphery of said disc for supporting same in rotative relation around said pin and in adjacent relation to said magnifying window; and an annulus adapted to be secured on a baby-nursing milk bottle and having an internal flange providing a centrally located aperture, said cap member with said flanged receptacle being accommodated in said annulus and protruding through said aperture.

3. A temperature-indicating device and closure cap, comprising an annulus having an internal flange providing a centrally located aperture, a circularly-flanged receptacle having a screw threaded socket in its center being disposed in said annulus and in abutment with said internal flange, and a plug member inserted through said aperture and positioned in said receptacle, said plug member having a dome with a magnifying window formed in diametric aspect thereof, the end opposite to the dome of said plug member being peripherally reduced to form an annular recess, and a heat-conducting cover plate with its peripheral margin turned up so as to receive said annular recess being hermetically sealed thereon, forming a chamber in said cap; an axial pin centrally formed on said cover plate and having one end extending to said dome and the opposite and shorter end projecting externally to said plate, said shorter end having screw threads to be engaged in said threaded socket in the center of said flanged receptacle to secure said plug member therein, a thermostatic spiral coiled around said pin located inside said chamber and having one end secured to said pin and the other end to a circular disc disposed between said window and said spiral, an aperture disposed in the center of said disc with said pin passing therethrough, said disc having thereon a plurality of consecutively arranged colored areas for giving a visible indication of the temperature conditions through said window upon rotation of said disc by means of said spiral with change of temperature thereof.

4. A temperature-indicating device and closure cap, comprising a cap having a magnifying window disposed in its dome, the end opposite to the dome of said cap being adapted to receive a circular cover plate, forming a chamber therein, an axial pin within said chamber being centrally positioned on said plate, a thermostatic element spirally coiled around said pin and having one end secured to said pin and the other to a circular indicating dial transversely disposed between said element and the dome of said cap and having an aperture in its center with said pin passing therethrough, said dial provided with means to represent temperature conditions and being rotative with reference to said window by means of said thermostatic element upon change of temperature; a pan-shaped receptacle having a flange with a gasket affixed to its underside, said cap being accommodated in said receptacle, an annulus provided on the periphery of said flange and adapted to be secured on a baby-nursing milk bottle, said annulus having an internal flange providing a centrally located aperture, said cap member with the flanged receptacle being accommodated in said annulus and protruding through said aperture.

5. A temperature-indicating device and closure cap, comprising an annulus adapted to be secured on a nursing milk bottle and having an internal flange providing a centrally-located aperture, a cap member having a chamber therein and a magnifying window in its dome, the end opposite to said dome being closed by a circular plate provided with a circular flange means having a gasket thereunder extending therefrom substantially beyond the periphery of said cap at right angles thereto, said cap member with said circular plate provided with said circular flange being accommodated in said annulus and protruding through said aperture, an indicator disposed in said cap in adjacent relation to said window, and a thermostatic spiral enclosed in said chamber and connected at one end to said indicator, and means within said chamber for securing the other end of said spiral against movement, said indicator having a plurality of consecutively colored areas thereupon for representing conditions of temperature and being rotative by means of said thermostatic spiral relative to said magnifying window upon change of temperature thereof.

6. A temperature-indicating device and closure cap, comprising an annulus adapted to be secured on a baby-nursing milk bottle and having at one end an integrally-formed internal flange providing a centrally-located aperture, a cap member having an opaque dome with a magnifying window disposed therein, the end opposite to said dome being closed by a cover plate which being secured to a pan-shaped receptacle having an annular flange extending therefrom substantially beyond the periphery of said cap at right angles thereto, said cap member with said flanged receptacle being accommodated in said annulus and protruding through said aperture, the annular flange of said receptacle being in abutment with the underside of said internal flange of the annulus, an axial pin centrally formed on said cover plate and projecting into said cap, a thermostatic coil spirally disposed around said pin and having one end secured to said pin and the other end to the periphery of an indicator dial having consecutively colored blue, green, and red areas thereupon and being disposed between said coil and said window and rotative therebetween by means of said coil upon change of temperature.

7. A temperature-indicating device and closure cap, comprising a cap member having a dome with a magnifying window disposed in the diametric aspect thereof, the end opposite to said dome being closed, to provide a chamber therein, by a circular plate attached to a flanged means extending at right angles to the periphery of said cap, a resilient member affixed under said means, and an annulus adapted to be secured on a baby-nursing milk bottle and having an internal flange providing a centrally-located aperture, said cap with said flange means being slidably accommodated in said annulus and protruding through said aperture, an axial pin centrally positioned in said chamber, and a bimetallic coil spirally disposed around said pin and having one end secured to said pin and the other end to an indicating dial transversely interposed between said coil and said dome; said dial having blue, green, and red colored sectors consecutively arranged thereon and being rotative by means of said coil in adjacent relation to said window under changes of temperature.

8. A temperature-indicating device and closure cap, comprising an annulus having an internal flange providing a centrally located aperture, a circular plate having a pan-shaped section formed in its center being slidably disposed in said annulus in abutment with said internal flange, a plug member inserted through said aperture and secured in the pan-shaped section of said circular plate in abutment with said internal flange, said plug member having a chamber and a magnifying window in its top and means having a plurality of colored areas thereupon being disposed within said chamber adjacent said window, a thermosensitive means positioned centrally within said chamber and connected to said means with colored areas for movement thereof with reference to said window under changes of temperature, said annulus having means adapted to secure said circular plate with said plug member on a baby-nursing milk bottle.

9. A temperature-indicating device and closure cap, comprising an annulus, a circular pate having a centrally-formed pan-shaped section being accommodated in said annulus, a cap member having a dome with a magnifying window therein and a bottom end adapted to be secured in said pan-shaped section, said cap member having a chamber, an axial pin centrally positioned in said chamber, a thermostatic spiral around said pin having one end secured to said pin and the other end to an indicating means transversely disposed between said spiral and said window, said indicating means having temperature-defining areas thereon being rotative by said spiral in adjacent relation to said window; resilient means affixed to said circular plate and means in said annulus adapted to secure, jointly with said resilient means, said circular plate with said cap on the mouth of a baby-nursing milk bottle.

10. A temperature-indicating device and closure cap, comprising a temperature-indicating cap member having a dome with a magnifying window disposed therein, and a closed bottom part provided with a circular flange extending therefrom at right angles to the periphery of said indicating cap, said cap having a chamber and an indicating means having temperature-defining areas thereon being disposed in said chamber in adjacent relation to said window, and means centrally positioned within said chamber and connected to said indicating means for moving said indicating means with reference to said window under changes in temperature, and an annulus provided on the periphery of said circular flange and adapted to be secured on the mouth of a baby-nursing milk bottle.

11. A temperature-indicating device and closure cap, comprising a cap member of opaque material having a transparent window radially disposed in its dome, the end opposite to said dome being closed by a heat-conductive plate hermetically sealed thereunto, forming a chamber therein, a discal dial having an apperture in it center transversely disposed in said chamber adjacent to said window, a pin centrally formed on said plate and extending to the dome of said cap after passing through the aperture of said dial, a thermostatic spiral disposed around said pin and having one end secured to said pin and the other end secured to the periphery of said dial, said dial having on its surface consecutively-arranged blue, green, and red colored areas to represent temperature conditions and being rotative, by means of said thermostatic element, around said pin and relative to said window, a pan-shaped receptacle detachably secured to and in abutment with the heat-conductive plate of said cap member and having a circular flange extending therefrom beyond the periphery of said cap, and an annular means removably provided about the periphery of said cap and adapted to secure said cap with said flanged receptacle on a baby-nursing milk bottle.

12. A temperature-indicating device and closure cap, comprising a cap member having a magnifying window in its dome, the end opposite to said dome having an annular shoulder on its external periphery and provided with an internal recess thereunder to receive a heat-conductive circular plate which is hermetically sealed thereunto, providing a chamber therein, an axial pin centrally formed on said plate and extending to the dome of said cap, a discal dial having consecutively-arranged temperature-indicating areas thereon and an aperture in its center being transversely disposed in said chamber with said axial pin passing through said aperture, a thermostatic element spirally positioned around said pin and in inferior aspect of said dial, one end of said element being secured to said pin and the other end to a point adjacent the periphery of said dial to support same in rotative relation to said window, a flanged receptacle having a centrally-located pan-shaped section to removably retain said indicating cap therein, and an annulus adapted to be secured on a nursing milk bottle and having an internal flange providing a centrally-located aperture, said cap with said flanged receptacle being accommodated in said annulus and said cap protruding through said aperture.

13. A temperature-indicating device and closure cap, comprising a cap member having a dome with a magnifying window, the end opposite to said dome being provided with a circular receptacle and an integral flange extending therefrom at right angles to the periphery of said cap, a gasket affixed under said flange, said cap having a chamber and an indicator transversely positioned in said chamber, said indicator having a discal section with a plurality of colored areas thereon and a U-section having one leg integral with said discal section and the other leg provided with an aperture and a pivot therethrough secured to said circular receptacle to permit swivel movement of said U-section thereof, an axial pin centrally formed on said circular receptacle and extending into said chamber, a thermostatic spiral having one end secured to said pin and the other end to said U-section, said U-section and said discal section being rotative relative to said magnifying window by means of said thermostatic spiral under changes of temperature thereof, and an annulus adapted to be secured on a baby-nursing milk bottle and having an internal flange providing an aperture therein, said cap with said flange being accommodated in said annulus and protruding through said aperture.

14. A temperature-indicating closure cap, comprising an annulus closed at one end by an integral plate having an upwardly formed annular flange centrally located thereon, a cap member having a dome with a magnifying window, the end opposite to said dome being internally recessed to receive said upwardly formed annular flange and permanently secured thereon, providing a chamber in said cap, a pin centrally positioned in said chamber and extending axially between said plate and said dome, and a thermostatic coil spirally disposed around said pin and having one end secured to said pin and the other end to the periphery of an indicator dial transversely positioned between said coil and said dome and having a centrally located aperture with said pin passing therethrough, said indicator dial having on its surface a plurality of consecutively-arranged colored areas to represent temperature conditions, and being rotative in adjacent relation to said window by means of said coil under changes of temperature, said annulus adapted to be secured on the mouth of a nursing milk bottle.

15. A temperature-indicating device and closure cap, comprising an annulus adapted to be secured on a nursing milk bottle and having an internal flange providing a centrally located aperture, a cap member having a magnifying window centrally disposed in its dome and being closed at its opposite end by a cover plate and a flange extending therefrom at right angles to the periphery of said cap member, said indicating cap member with said flange being accommodated in said annulus and protruding through said aperture, with said flange being in abutment with the internal flange of said annulus, said cap member having a chamber and a pin centrally formed on said cover plate and extending axially in said chamber, a thermostatic coil spirally disposed around said pin and having one end secured thereto and the other end to an indicator dial transversely disposed between said coil and the dome of said cap member, said dial having a U-shaped section extending therefrom with one leg of said U-section being in the same plane thereof and the opposite leg having an aperture and a pivot therethrough secured to said cover plate radially thereto; said indicator dial having thereon blue, green, and red colored areas representing temperature conditions and being rotative with reference to said window by said thermostatic coil under changes in temperature thereof.

16. A temperature-indicating closure cap, comprising an annulus adapted to be secured on a nursing milk bottle and having an internal flange providing a centrally-located aperture, a cap having a dome with a magnifying window disposed in its center, the end opposite to said dome being closed by a flanged plate, providing a chamber therein, the flanged section of said plate extending substantially beyond the periphery of said cap at right angles thereto, said cap with said flanged plate being accommodated in said annulus and protruding through said aperture, an indicating dial transversely disposed in said chamber adjacent said window and having consecutively-arranged blue, green, and red colored areas thereon to represent temperature conditions, said dial being provided with an L-shaped section whose side which is in the same plane with said dial being apertured and a pin positioned in said aperture to pivot said dial on said dome in radial aspect thereto, with the free end of said L-shaped section projecting into said chamber, an axial pin formed on said flanged plate and a thermostatic coil spirally disposed around said pin with one end of said coil secured to said pin and the other end to the free end of said L-section of the dial, said dial being rotative relative to said window by means of said coil under changes of temperature in said milk bottle.

17. In a temperature-indicating closure cap, a temperature indicating device comprising a cap member having a dome with a magnifying window centrally disposed therein, the end opposite to said dome being closed by a flanged receptacle, providing a chamber therein, said flange of said receptacle extending at right angles to the periphery of said cap, an axial pin centrally formed on said receptacle and projecting into said chamber, a semilunar dial having on its surface a plurality of consecutively-arranged colored areas to indicate conditions of temperature being transversely disposed in said chamber and containing an aperture and a pin therethrough to pivot said dial on said dome and radially thereto, the section of said dial beyond said aperture being bent at right angles to said dial, forming a lip thereof, and a rectangular aperture formed in said lip; a thermostatic coil spirally disposed around said axial pin and having one end secured to said pin and the other end engaged in the aperture of said lip; said semilunar dial being rotative relative to said window by means of said thermostatic coil under changes of temperature; and an annulus adapted to be secured on a nursing milk bottle and having an internal flange providing a centrally-located aperture, said cap member with said flanged receptacle being accommodated in said annulus and protruding through said aperture.

18. A temperature-indicating closure cap as set forth in claim 13, in which the integral plate of said annulus being provided with apertures in peripheral relation to said cap member containing the temperature indicator, and tubular members passing through said apertures and secured therein.

19. A temperature-indicating device and closure cap, comprising an annulus adapted to be secured on a nursing milk bottle and having an internal flange, a cap member having a dome with a magnifying window therein, means securing said cap member to said internal flange of said annulus and forming a chamber in said cap, an indicating discal dial with colored temperature-defining means thereon trasversely positioned within said chamber in adjacent relation to said window, and thermosensitive means centrally pivoted within said chamber and attached to said discal dial with temperature-defining means for movement thereof with reference to said window under changes of temperature.

20. A temperature-indicating device and closure cap, comprising a cap having a dome with a magnifying window therein, the end opposite to said dome having a circular means extending outwardly to the periphery of said cap and at right angles thereto, a chamber formed in said cap between said dome and said circular means, a disc with indicating means transversely disposed within said chamber adjacent to said window in said dome, thermosensitive means centrally positioned within said chamber and connected to said disc for movement thereof with reference to said window under changes of temperature and means provided on the periphery of said circular means and adapted to secure said cap and said circular means on a nursing milk bottle.

21. In a temperature-indicating device forming a part of a closure cap, comprising a cap having a dome with a magnifying window therein, the end of the cap opposite to said dome having a circular plate providing a chamber therein, means contiguous with said circular plate and extending therefrom outwardly and around the periphery of said cap and at right angles thereto, said means having a gasket thereunder and an annulus on the periphery thereof and attaching said cap to said annulus which is adapted to be secured on a nursing milk bottle, with said gasket therebetween, a discal member with temperature-defining means thereon positioned transversely in said chamber, and thermosensitive means centrally pivoted within said chamber and connected to said discal member for movement thereof relative to said window under changes of temperature in said bottle.

22. A temperature-indicating device and closure cap, comprising an annulus adapted to be secured on a nursing milk bottle and having an internal flange; a cap member having a dome with a magnifying window therein; means attaching said cap member to said internal flange of said annulus in a manner to form a chamber therein; a centrally disposed pin in said chamber; a thermostatic element spirally disposed around said pin and having one end secured to said pin; and an indicating dial transversely disposed in said chamber between said window and said thermostatic element and attached to the other end of said thermostatic element; said dial being rotative by means of said thermostatic element upon change of temperature in said bottle.

23. A temperature-indicating device and closure cap, comprising a cap member having a dome and a magnifying window in said dome, a circular plate secured to the bottom of said cap forming a chamber therein, flange means at the bottom edge of said cap and extending outwardly beyond the bottom edge thereof at right angles to the periphery of said cap member, and an annulus provided on the periphery of said flange means and adapted to secure said cap member by means of said flange means on a baby-nursing milk bottle; a discal member having temperature-defining means thereon being transversely positioned within said chamber in adjacent relation to said window, and a thermosensitive means centrally pivoted in said chamber and connected to said discal member for movement thereof relative to said window under changes of temperatures in said milk bottle.

24. A temperature-indicating device and closure cap, comprising a cap having a dome, a circular plate secured to the bottom of said cap forming a chamber therein, a circular flanged receptacle fitted over the bottom of said cap and having a circular flange extending outwardly beyond the bottom edge of said cap, and an annulus adapted to be secured on a baby-nursing milk bottle and having an internal flange providing a centrally-located aperture, said cap being removably accommodated in said annulus and protruding through said aperture; said cap having a magnifying window in its dome, and indicating discal means having thereon consecutively-arranged blue, green, and red means to define temperature condition being transversely disposed in said chamber and adjacent said window, spiral means centrally positioned in said chamber and connected to said discal means for movement thereof to consecutively change the position of said colored means thereon relative to said window under changes of temperature in said milk bottle.

25. A temperature-indicating device and closure cap, comprising a cap having a dome with a magnifying window in the diametric aspect of said dome, a circular plate secured to the bottom of said cap forming a chamber therein, a circular flanged receptacle fitted over the bottom of said cap and having a circular flange extending outwardly beyond the bottom edge of said cap, and an annulus adapted to be secured on a baby-nursing milk bottle and having an internal flange providing a centrally-located aperture, said cap and said flanged receptacle being accommodated in said annulus with said cap protruding through said aperture, a discal member having consecutively-arranged sectors thereon for designating cold, normal, and hot conditions of temperature being transversely positioned in said chamber with said sectors in opposing aspect to said window, thermosensitive means pivoted in said chamber in inferior aspect of said discal member and connected to said discal member for axial movement thereof with respect to said window under changes of temperature in said milk bottle.

26. A temperature-indicating device and closure cap, comprising an annulus adapted to be secured on a baby-nursing milk bottle and having an internal flange providing a centrally-located aperture, a cap having a dome with a magnifying window, a circular plate secured to the bottom of said cap forming a chamber therein, a circular flanged receptacle fitted over the bottom of said cap and having a circular flange extending outwardly beyond the bottom edge of said cap, said cap with said flanged receptacle being accommodated in said annulus with said cap protruding through said aperture; a thermosensitive spiral centrally positioned in said chamber, and a discal indicator connected to said spiral and having a plurality of consecutively-arranged temperature-designating indications thereon being disposed transversely in said chamber between said spiral and said window and rotative with reference to said window by means of said spiral to consecutively expose said indications through said window under changes of temperature in said milk bottle.

References Cited in the file of this patent

UNITED STATES PATENTS

| 1,441,363 | Manns | Jan. 9, 1923 |
| 1,637,805 | Chace | Aug. 2, 1927 |
| 1,692,301 | Heslewood | Nov. 20, 1928 |
| 1,900,696 | Day | March 7, 1933 |
| 1,973,838 | Zubaty | Sept. 18, 1934 |
| 2,048,512 | Oakley | July 21, 1936 |
| 2,674,882 | Doggett | April 13, 1954 |

FOREIGN PATENTS

| 413,619 | Great Britain | Oct. 10, 1932 |